(12) United States Patent
Watari et al.

(10) Patent No.: US 10,427,055 B2
(45) Date of Patent: Oct. 1, 2019

(54) GAME VIDEO DISTRIBUTION DEVICE, GAME VIDEO DISTRIBUTION METHOD, AND GAME VIDEO DISTRIBUTION PROGRAM

(71) Applicant: Sony Interactive Entertainment Inc., Tokyo (JP)

(72) Inventors: Yasuhiro Watari, Tokyo (JP); Toshiya Ikenaga, Tokyo (JP); Toshiharu Sayano, Kanagawa (JP); Shinkichi Hasama, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 15 days.

(21) Appl. No.: 15/128,705

(22) PCT Filed: Mar. 31, 2015

(86) PCT No.: PCT/JP2015/060204
§ 371 (c)(1),
(2) Date: Sep. 23, 2016

(87) PCT Pub. No.: WO2015/156177
PCT Pub. Date: Oct. 15, 2015

(65) Prior Publication Data
US 2017/0136367 A1    May 18, 2017

(30) Foreign Application Priority Data
Apr. 7, 2014    (JP) .................................. 2014-078773

(51) Int. Cl.
*A63F 13/86*    (2014.01)
*A63F 13/35*    (2014.01)
(Continued)

(52) U.S. Cl.
CPC .............. *A63F 13/86* (2014.09); *A63F 13/35* (2014.09); *A63F 13/355* (2014.09);
(Continued)

(58) Field of Classification Search
CPC ..... A63F 13/53; A63F 13/86; A63F 2300/577
See application file for complete search history.

(56) References Cited

U.S. PATENT DOCUMENTS 8,498,722 B2 * 7/2013 Chung ................. H04N 21/274
463/16
8,622,839 B1    1/2014 McKenzie
(Continued)

FOREIGN PATENT DOCUMENTS

GB    2458812 A    10/2009
GB    2505877 A    3/2014
(Continued)

OTHER PUBLICATIONS

International Search Report for corresponding PCT Application No. PCT/JP20151060204, 2 pages, dated Jul. 7, 2015.
(Continued)

*Primary Examiner* — David Duffy
(74) *Attorney, Agent, or Firm* — Matthew B. Dernier, Esq.

(57) ABSTRACT

There is provided a game video distribution device that permits distribution of game videos with higher value for users through the use of game-specific information. The game distribution device includes video generating means that generates a game video selected by a user, related information acquiring means that acquires related information in which scene identification information identifying individual scenes included in the game video is related to time information representing a time period during which each of the scenes is reproduced, related display information
(Continued)

generating means which, in accordance with the related information, generates related display information identifiably displaying a temporal location of each of the scenes relative to an entire time span of the game video, and composing means that generates a composite of the generated video and the related display information.

10 Claims, 9 Drawing Sheets

(51) Int. Cl.
    *A63F 13/537*     (2014.01)
    *A63F 13/63*     (2014.01)
    *H04N 21/4722*     (2011.01)
    *H04N 21/84*     (2011.01)
    *H04N 21/8549*     (2011.01)
    *A63F 13/355*     (2014.01)
    *A63F 13/497*     (2014.01)

(52) U.S. Cl.
    CPC .......... *A63F 13/497* (2014.09); *A63F 13/537* (2014.09); *A63F 13/63* (2014.09); *H04N 21/4722* (2013.01); *H04N 21/8402* (2013.01); *H04N 21/8549* (2013.01); *A63F 2300/577* (2013.01)

(56) References Cited

U.S. PATENT DOCUMENTS

| 8,657,680 | B2* | 2/2014 | Chung | H04N 21/274 463/31 |
|---|---|---|---|---|
| 8,670,651 | B2 | 3/2014 | Sakuragi | |
| 8,699,847 | B2 | 4/2014 | Suzuki | |
| 8,998,725 | B2* | 4/2015 | Wakeford | A63F 13/60 463/31 |
| 9,155,970 | B2 | 10/2015 | Koyama | |
| 9,486,698 | B2* | 11/2016 | Chung | H04N 21/274 |
| 9,848,245 | B2* | 12/2017 | Chung | H04N 21/274 |
| 9,992,543 | B2* | 6/2018 | Chung | H04N 21/274 |
| 10,219,041 | B2* | 2/2019 | Chung | H04N 21/274 |
| 2006/0287105 | A1* | 12/2006 | Willis | A63F 13/12 463/42 |
| 2007/0117635 | A1* | 5/2007 | Spanton | A63F 13/12 463/43 |
| 2007/0294089 | A1* | 12/2007 | Garbow | A63F 13/12 705/26.1 |
| 2007/0297755 | A1* | 12/2007 | Holt | G11B 27/034 386/240 |
| 2007/0298878 | A1* | 12/2007 | Short | A63F 13/53 463/31 |
| 2009/0132935 | A1* | 5/2009 | Van Zwol | G06F 17/30817 715/756 |
| 2009/0210395 | A1* | 8/2009 | Sedam | H04W 4/00 |
| 2010/0240459 | A1 | 9/2010 | Shelton | |
| 2010/0292011 | A1* | 11/2010 | Kira | A63F 13/497 463/43 |
| 2011/0151971 | A1* | 6/2011 | Altshuler | A63F 13/12 463/30 |
| 2011/0262110 | A1 | 10/2011 | Suzuki | |
| 2012/0040754 | A1* | 2/2012 | Dutilly | A63F 13/493 463/30 |
| 2012/0100910 | A1* | 4/2012 | Eichorn | H04N 21/43615 463/31 |
| 2012/0159327 | A1 | 6/2012 | Law | |
| 2012/0201517 | A1 | 8/2012 | Sakuragi | |
| 2012/0308192 | A1* | 12/2012 | Chung | H04N 21/44218 386/230 |
| 2012/0309511 | A1* | 12/2012 | Chung | H04N 21/274 463/30 |
| 2012/0309515 | A1* | 12/2012 | Chung | H04N 21/274 463/31 |
| 2013/0005471 | A1* | 1/2013 | Chung | A63F 13/63 463/42 |
| 2013/0215144 | A1 | 8/2013 | Anzai | |
| 2014/0100034 | A1* | 4/2014 | Chung | H04N 21/274 463/31 |
| 2014/0274387 | A1* | 9/2014 | Lewis | A63F 13/00 463/31 |
| 2014/0297260 | A1* | 10/2014 | Allen | G06F 3/04842 704/9 |
| 2014/0323213 | A1* | 10/2014 | Wakeford | A63F 13/60 463/31 |
| 2015/0094146 | A1 | 4/2015 | Koyama | |
| 2016/0366330 | A1* | 12/2016 | Boliek | G06F 16/7867 |
| 2017/0127135 | A1* | 5/2017 | Chung | H04N 21/274 |
| 2017/0228600 | A1* | 8/2017 | Syed | G06K 9/00751 |
| 2018/0084304 | A1* | 3/2018 | Chung | H04N 21/274 |
| 2018/0262808 | A1* | 9/2018 | Chung | H04N 21/274 |

FOREIGN PATENT DOCUMENTS

| JP | 2002239225 A | 8/2002 |
|---|---|---|
| JP | 2004363643 A | 12/2004 |
| JP | 2005100434 A | 4/2005 |
| JP | 2010046159 A | 3/2010 |
| JP | 2011229065 A | 11/2011 |
| JP | 2012165313 A | 8/2012 |
| JP | 2013061889 A | 4/2013 |
| JP | 2013229672 A | 11/2013 |
| JP | 201439862 A | 3/2014 |
| WO | 2009073610 A2 | 6/2009 |
| WO | 2011148542 A1 | 12/2011 |

OTHER PUBLICATIONS

International Preliminary Report for corresponding PCT Application No. PCT/JP2015/060204, 7 pages, dated Oct. 20, 2016.
Extended European Search Report for corresponding EP Application No. 15776210.5, 18 pages, dated Feb. 8, 2018.
William A Hamilton et al: "Synchronized communication and coordinated views" CHI 2009—Digital Life, New World: Conference Proceedings and Extended Abstracts; The 27th Annual CHI Conference on Human Factors in Computing Systems, Apr. 4-9, 2009 in Boston, USA, ACM, Association for Computing Machinery, US, pp. 4573-4578,(Apr. 4, 2009).
Japanese Preliminary Report for corresponding JP Application No. 2016512682, 6 pages, dated May 18, 2018.
Notification of Refusal for corresponding JP Application No. 2016512682, 13 pages, dated Jan. 22, 2019.

* cited by examiner

| GAME ID | GAME VIDEO ID |
|---------|---------------|
| G1 | D1 |
| G1 | D2 |
| G1 | D3 |

| BOSS BATTLE ID | TIME |
|---|---|
| B1 | t1~t2 |
| B2 | t3~t4 |
| B3 | t5~t6 |

| LOCATION ID | TIME |
|---|---|
| L1 | t1~t4 |
| L2 | t4~t5 |
| L3 | t5~t7 |

| EVENT ID | TIME |
|---|---|
| I1 | t2~t3 |
| I2 | t8~t9 |

| STAGE ID | TIME |
|---|---|
| S1 | t1~t10 |
| S2 | t11~t15 |

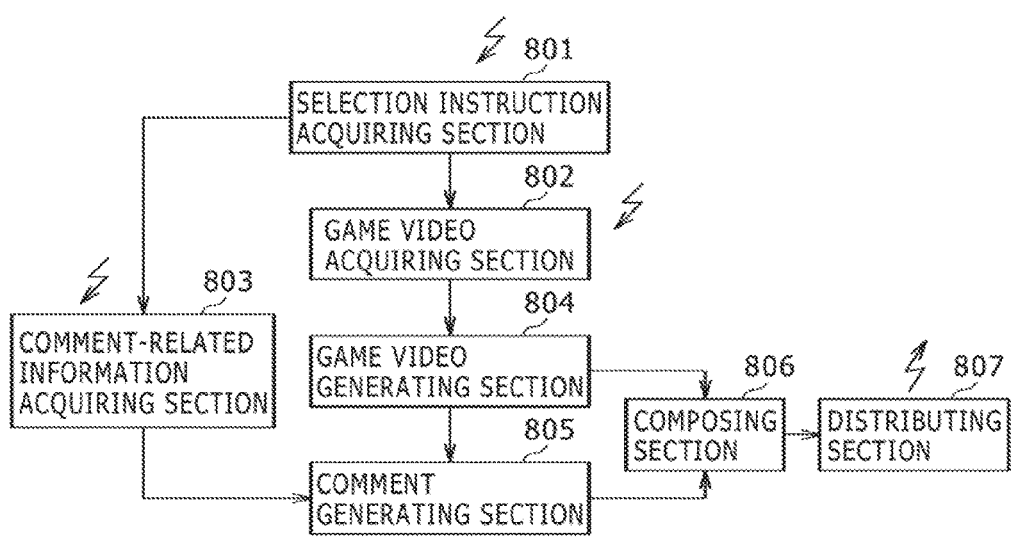

| EVENT ID | COMMENT ID |
|---|---|
| I1 | C6 |
| I1 | C7 |

GAME VIDEO DISTRIBUTION DEVICE, GAME VIDEO DISTRIBUTION METHOD, AND GAME VIDEO DISTRIBUTION PROGRAM

TECHNICAL FIELD

The present invention relates to a game video distribution device, a game video distribution method, and a game video distribution program.

BACKGROUND ART

There exist known video-sharing services allowing an unspecified large number of users to post videos to the server on the Internet for shared viewing by a large indefinite number of users, for example. Among the posted videos are game videos that include game play recordings, for example.

SUMMARY

Technical Problem

Where any one of these video-sharing services is used to view a game video, there is no viewing service available which would, while allowing the game video to be viewed just like ordinary videos, offer game-specific information such as information about specific events taking place in individual scenes of the game.

It is therefore an object of the present invention to provide a game video distribution device, among others, that permits distribution of game videos with higher value for users through the use of game-specific information.

Solution to Problem (1) According to one embodiment of the present invention, there is provided a game video distribution device including: video generating means that generates a game video selected by a user; related information acquiring means that acquires related information in which scene identification information identifying individual scenes included in the game video is related to time information representing a time period during which each of the scenes is reproduced; related display information generating means which, in accordance with the related information, generates related display information identifiably displaying a temporal location of each of the scenes relative to an entire time span of the game video; and composing means that generates a composite of the generated video and the related display information.

(2) Preferably in the game video distribution device described in paragraph (1) above, the scenes may include a plurality of scene types, and the related display information generating means may generate the related display information displaying each of the scenes in each of the scene types.

(3) Preferably, the game video distribution device described in paragraph (1) or (2) above may further include setting information acquiring means that acquires setting information about the generation of the game video. In the game video distribution device, the video generating means may generate a game video formed of at least a part of the game video on the basis of the setting information.

(4) Preferably, the game video distribution device described in paragraph (3) above may further include progress information acquiring means that acquires, as the setting information, progress information indicative of progress status of the user regarding a game program corresponding to the game video. In the game video distribution device, the video generating means may generate a game video formed of at least a part of the game video in accordance with the progress status of the user.

(5) Preferably, the game video distribution device described in any one of paragraphs (1) to (4) above may further include: selection instruction acquiring means which, in accordance with a selection instruction from the user, acquires game identification information identifying the game desired to be viewed by the user and scene identification information identifying a scene in the game video indicative of a video of the game; and selection screen generating means that generates selection screen information representing a selection screen selecting a plurality of game videos identified by game video identification information related to the acquired game identification information and to the acquired scene identification information. In the game video distribution device, the video generating means may generate one of the game videos among the plurality of game videos in accordance with a selection by the user.

(6) Preferably, the game video distribution device described in any one of paragraphs (1) to (5) above may further include related information generating means that generates the related information on the basis of the generated game video.

(7) According to another embodiment of the present invention, there is provided a game video distribution method including: generating a game video selected by a user; acquiring related information in which scene identification information identifying individual scenes included in the game video is related to time information representing a time period during which each of the scenes is reproduced; in accordance with the related information, generating related display information identifiably displaying a temporal location of each of the scenes relative to an entire time span of the game video; and generating a composite of the generated video and the related display information.

(8) According to a further embodiment of the present invention, there is provided a game video distribution program for causing a computer to function as: video generating means that generates a game video selected by a user; related information acquiring means that acquires related information in which scene identification information identifying individual scenes included in the game video is related to time information representing a time period during which each of the scenes is reproduced; related display information generating means which, in accordance with the related information, generates related display information identifiably displaying a temporal location of each of the scenes relative to an entire time span of the game video; and composing means that generates a composite of the generated video and the related display information.

(9) According to an even further embodiment of the present invention, there is provided a game video distribution device including: game video generating means that generates a game video; comment-related information acquiring means that acquires game video identification information representing another game video of the same game as that of the game video, event identification information related to the game video identification information and identifying an event in the game video, and comment-related information including comment identification information identifying a comment on the event; comment generating means which, on the basis of the comment-related information, generates comment display information displaying the comment identified by the comment identification information; and composing means that generates a composite video of the generated comment display information and the generated game video.

(10) Preferably, the game video distribution device described in paragraph (9) above may further include game video identification information acquiring means which, in accordance with an instruction from a user, acquires game video identification information identifying a game video. In the game video distribution device, the game video generating means may generate the game video identified by the acquired game video identification information.

(11) Preferably, the game video distribution device described in paragraph (9) above may further include: game identification information acquiring means which, in accordance with an instruction from a user, acquires game identification information identifying a game; and game program acquiring means that acquires a game program identified by the acquired game identification information. In the game video distribution device, the game video generating means may generate the game video by executing the acquired game program.

(12) Preferably in the game video distribution device described in any one of paragraphs (9) to (11) above, the comment generating means may include: event detecting means that detects an event from the generated game video on the basis of the comment-related information; and comment acquiring means that acquires comment identification information identifying a comment on the detected event. In the game video distribution device, the comment generating means may generate comment display information displaying the comment identified by the comment identification information upon detection of the event.

(13) Preferably, the game video distribution device described in any one of paragraphs (9) to (12) above may further include comment-related information updating means that updates the comment-related information on the basis of a comment from a user viewing the game video.

(14) According to a still further embodiment of the present invention, there is provided a game video distribution method including: generating a game video; acquiring game video identification information representing another game video of the same game as that of the game video, event identification information related to the game video identification information and identifying an event in the game video, and comment-related information including comment identification information identifying a comment on the event; on the basis of the comment-related information, generating comment display information displaying the comment identified by the comment identification information; and generating a composite video of the generated comment display information and the generated game video.

(15) According to a yet further embodiment of the present invention, there is provided a game video distribution program for causing a computer to function as: game video generating means that generates a game video; comment-related information acquiring means that acquires game video identification information representing another game video of the same game as that of the game video, event identification information related to the game video identification information and identifying an event in the game video, and comment-related information including comment identification information identifying a comment on the event; comment generating means which, on the basis of the comment-related information, generates comment display information displaying the comment identified by the comment identification information; and composing means that generates a composite video of the generated comment display information and the generated game video.

BRIEF DESCRIPTION OF DRAWINGS

FIG. 8 is a schematic view outlining a typical functional structure of a controlling section in a server according to a second embodiment.

FIG. 9 is a schematic view depicting typical game-related information according to the second embodiment.

FIG. 10 is a schematic view depicting typical comment-related information according to the second embodiment.

DESCRIPTION OF EMBODIMENTS

Figure 1:
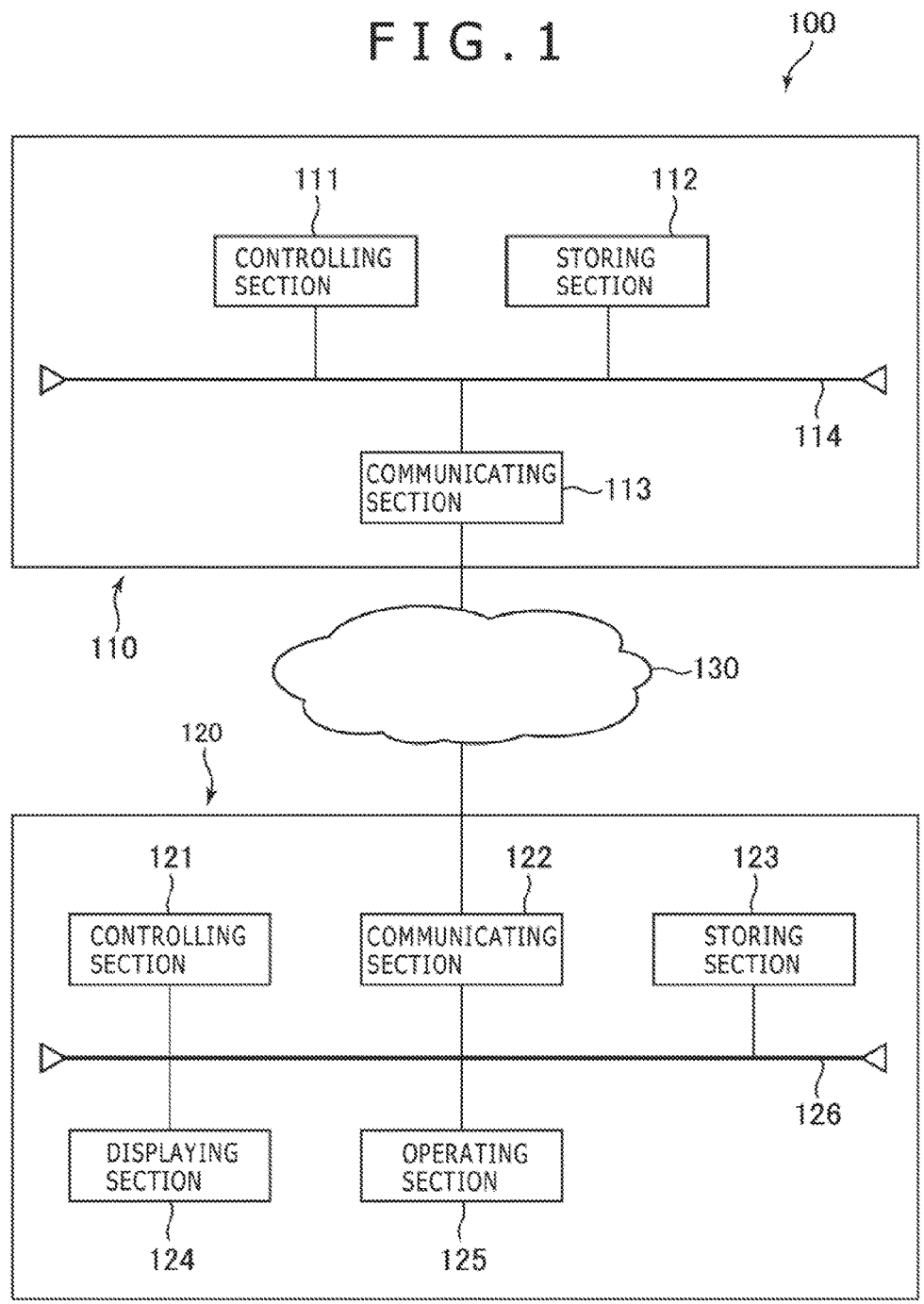
FIG. 1 is a schematic view outlining a typical hardware configuration of a game video distribution system according to a first embodiment.

Some preferred embodiments of the present invention are described below with reference to the accompanying drawings. Throughout the drawings, like or corresponding parts are designated by like reference numerals, and their descriptions are omitted where redundant.

First Embodiment

FIG. 1 is a schematic explanatory view outlining a typical hardware configuration of a game video distribution system as a first embodiment of the present invention. As depicted in FIG. 1, a game video distribution system 100 has a server 110 and a terminal 120 interconnected with each other via a network 130 (e.g., the Internet). Although the game video distribution system 100 in FIG. 1 has only one terminal 120, a plurality of terminals 120 may be provided instead.

As depicted in FIG. 1, the server 110 includes a controlling section 111, a storing section 112, and a communicating section 113. The controlling section 111, the storing section 112, and the communicating section 113 are interconnected with one another via a bus 114. The controlling section 111 is for example a central processing unit (CPU) that runs in accordance with programs stored in the storing section 112. The storing section 112 is, for example, an information recording medium that is constituted by an information recording medium such as a hard disk drive, a read-only memory (ROM), or a random access memory (RAM), and holds the programs to be executed by the controlling section 111. The storing section 112 also acts as a work memory for the controlling section 111. The communicating section 113 is for example a network interface that transmits and receives information via the network 130 under instructions from the controlling section 111.

The terminal 120 includes a controlling section 121, a communicating section 122, a storing section 123, a displaying section 124, and an operating section 125. The sections 121 through 125 are likewise interconnected with one another via a bus 126. As with the above-mentioned server 110, the controlling section 121 is for example a CPU that runs in accordance with programs stored in the storing section 123. The communicating section 122 is a network interface that transmits and receives information via the network 130 under instructions from the controlling section 121.

The storing section 123 is, for example, an information recording medium that is constituted by an information recording medium such as a hard disk drive, a ROM, or a RAM, and holds the programs to be executed by the controlling section 121. The storing section 123 also acts as a work memory for the controlling section 121. The displaying section 124 is for example a liquid crystal display unit or an organic electroluminescence (EL) display unit that displays information under instructions from the controlling section 121. The operating section 125 is, for example, constituted by an interface such as a keyboard, a mouse, a controller, and/or buttons outputting, in accordance with user's instruction operations, the content of the instruction operations to the controlling section 121.

The programs processed by the controlling sections 111 and 121 may be downloaded and offered over the network for example, or offered by use of various computer-readable information recording media such as a compact disc (CD)-ROM or a digital versatile disc (DVD)-ROM. The above-described structures of the server 110 and the terminal 120 are only examples and are not limited thereto. Further, the above-described structure of the game video distribution system 100 is only example and is not limited thereto, and may be implemented using the so-called cloud service technology, for example. The terminal 120 corresponds to a combination of a personal computer and a display unit, a smartphone, a tablet, a notebook personal computer, a combination of a game device and a television (TV) set, or a combination of a handheld game machine and a TV set, for example.

Figures 2, 3:
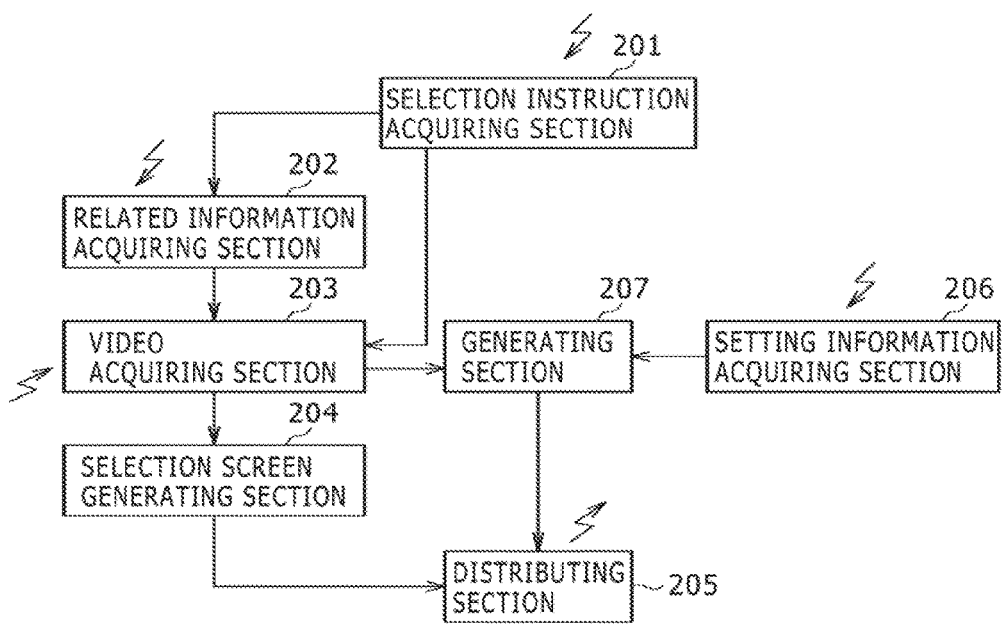
FIG. 2 is a schematic view outlining a typical functional structure of a controlling section in a server according to the first embodiment.
FIG. 3 is a schematic view depicting typical game-related information according to the first embodiment.

Described below is an outline of a typical functional structure of the controlling section 111 in the server 110 according to the present embodiment. As depicted in FIG. 2, the controlling section 121 functionally includes a selection instruction acquiring section 201, a related information acquiring section 202, a video acquiring section 203, a selection screen generating section 204, a distributing section 205, a setting information acquiring section 206, and a generating section 207, for example.

The selection instruction acquiring section 201 acquires selection instructions from the user. Specifically, from the terminal 120 used by the user, the selection instruction acquiring section 201 acquires game identification information (game identification (ID)) identifying the game desired to be viewed by the user, and scene identification information (scene ID) identifying the scene desired to be viewed by the user in the game of interest, for example. Here, the scene ID corresponds to information identifying a specific scene such as a specific boss battle, a specific location, a specific event, or a specific stage in the game video, for example.

The related information acquiring section 202 acquires game video identification information (game video ID) on the basis of the game ID and the scene ID acquired by the selection instruction acquiring section 201.

Figures 4, 5:
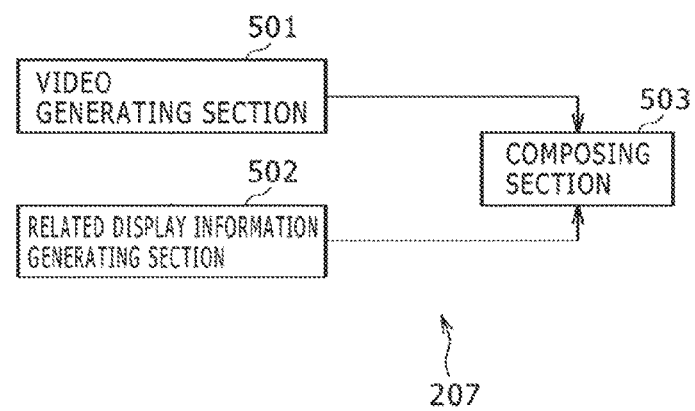
FIG. 4 is a schematic view depicting typical scene-related information according to the first embodiment.
FIG. 5 is a schematic view depicting a typical functional structure of a generating section according to the first embodiment.

Specifically, as depicted in FIG. 3, the storing section 112 stores game-related information in which game IDs are related to game video IDs, for example. Also, as depicted in FIG. 4, the storing section 112 stores scene-related information in which the scene ID of each of different scene types (e.g., boss battle, event, or stage) is related to time information representing the time period during which the scene identified by the scene ID of the scene type is reproduced, for example. The scene-related information is stored with regard to each game video ID. The related information acquiring section 202 acquires the game video ID related to the game ID acquired by the selection instruction acquiring section 201.

More specifically, given the game-related information depicted in FIG. 3, the selection instruction acquiring section 201 may acquire the game ID of G1 and the boss battle ID of B1 as the scene ID, for example. In that case, the game video IDs of D1 to D3 are acquired.

From the scene-related information stored in relation to the game ID, the related information acquiring section 202 acquires the game video ID that includes the scene ID acquired by the selection instruction acquiring section 201. Specifically, suppose that with the boss battle ID of B1 acquired as the scene ID in the above example, the scene-related information related to the game video ID of D1 is as depicted in FIG. 4. In that case, the related information acquiring section 202 acquires the game video ID of D1 including the boss battle ID of B1 from the scene-related information related to the game video ID of D 1. The scene-related information in FIG. 4 depicts, for example, that the boss battle identified by the boss battle ID of B1 is reproduced during a time period t1 to t2 in the game video and that the boss battle identified by the boss battle ID of B2 is reproduced during a time period t3 to t4 in the game video. It is likewise depicted that the boss battle identified by the location ID of L1 is reproduced during a time period t1 to t4 in the game video and that the boss battle identified by the location ID of B2 is reproduced during a time period t4 to t5 in the game video. That is, the scene identification information identifying each scene is related to the time information indicative of the time period during which that scene is reproduced.

The video acquiring section 203 acquires the game video identified by a game ID on the basis of the game ID acquired by the related information acquiring section 202. Each game video is stored in the storing section 112 in relation to the corresponding game ID, for example. In the above example, the video acquiring section 203 acquires each game video identified by the game video ID which is related to the game ID of G1 and which includes the boss battle ID of B1, for example.

The selection screen generating section 204 generates selection screen information representing a selection screen that allows the user to select a video desired to be viewed from the game videos acquired by the video acquiring section 203. The distributing section 205 distributes the selection screen information to the terminal 120. The selection screen includes, for example, a list of thumbnail images indicative of game videos. The selection instruction acquiring section 201 acquires the game video ID identifying the video desired to be viewed by the user. Specifically, the user selects the game video while referencing the selection screen. With the game video thus selected, the selection instruction acquiring section 201 acquires the corresponding game video ID.

The setting information acquiring section 206 acquires setting information for use in generating game videos. Specifically, the setting information is about the settings for reproducing game videos for example. The setting information also includes information about the settings for creating a digest of a game video so that its major scenes alone will be reproduced. Specifically, if the game video is of an action game, for example, its digest may be created by filtering out automatically the plays that failed to conquer stages; if the game video is of a role-playing game (RPG) game, its digest may be created by automatically filtering out the displacements from one city to another during the game. As another alternative, a digest of the game video may be created by simply reproducing it partially. The partial reproduction may be performed on multiple levels. Also, the setting may be such as to filter out spoiler scenes such as the last scene of the game that would cause the players playing the game to lose interest therein. The setting may also be such as to prevent users from knowing the outcome of the game (i.e., spoiler prevention settings).

The generating section 207 generates video information to be displayed on a screen of the terminal 120. Specifically, as depicted in FIG. 5, the generating section 207 functionally includes a video generating section 501, a related display information generating section 502, and a composing section 503, for example.

The video generating section 501 generates the game video selected by the user in accordance with the setting information. Specifically, if the setting information specifies that only major scenes are to be made into a digest, the video generating section 501 generates for example a game video which contains solely the major scenes of the video and which is reproduced at intervals of a predetermined time period. If the setting constitutes the spoiler prevention settings for preventing the outcome of the game from being known, there may be provided a progress information acquiring section (not depicted) that may acquire progress information representing the progress status of the user's play in the game program corresponding to the game video. The progress information acquiring section may then be configured to reproduce only part of the game video in keeping with the progress status. Specifically in this case, the progress information acquiring section may generate a game video which only includes the scenes having been already played by the user and which excludes the scenes of the stages yet to be cleared by the user, for example.

Figure 6:
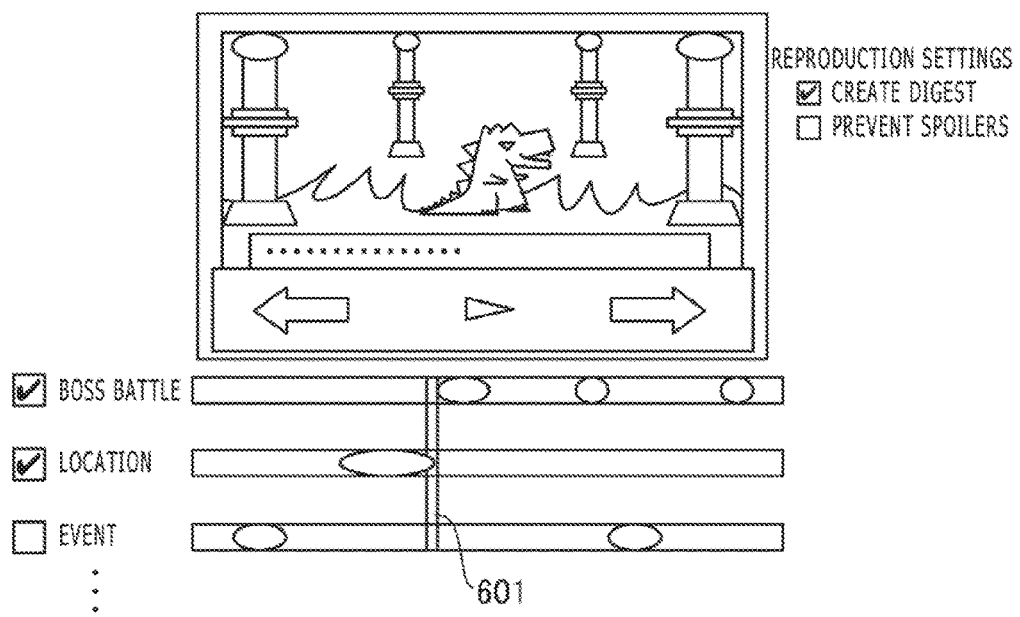
FIG. 6 is a schematic view depicting a typical composite video distributed to terminals according to the first embodiment.

The related display information generating section 502 generates related display information displayed concurrently in relation to the game video being reproduced. Specifically, as depicted in FIG. 6, the related display information represents for example a progress bar indicative of the current reproduction location relative to an entire time span of the video, and information indicative of the selections made with the setting information. Here, the related display information generating section 502 is configured, for example, on the basis of the scene-related information depicted in FIG. 4, to display identifiably various scenes by scene type (e.g., by boss battle, by location, or by event), such as the scene where a boss battle is being fought, the scene of a specific location, and the scene where a specific event is taking place.

In the case of the example in FIG. 4 depicting the scene-related information, the boss battle identified by the boss battle ID of B1 is displayed at the location identified by the time period t1 to t2 along the progress bar, for example. The user may be allowed to select the types of scenes to be displayed. The current reproduction location of the game video is also displayed. As with ordinary video-viewing services, the user may be allowed to shift the reproduced location to make a desired change of the reproduction location. In FIG. 6, reference numeral 601 indicates the reproduction location. As depicted in FIG. 6, there may be provided icons indicative of fast forward and rewind, among others, so that the indicated operation such as fast forward will be performed when selected. Arrangements can also be made so that when a given event in FIG. 6 is clicked on, a detailed classification of the event (e.g., first boss battle) is displayed.

The composing section 503 generates a composite of the game video information and the related display information generated as described above. Specifically, as depicted in FIG. 6, the composing section 503 generates composite video information for concurrently displaying both the video generated by the video generating section 501 and the related display information displayed by the related display information generating section 502. The distributing section 205 distributes the composite video information to the terminal 120. The composite video information depicted in FIG. 6, it should be noted, is only an example and is not limited thereto.

Figure 7:
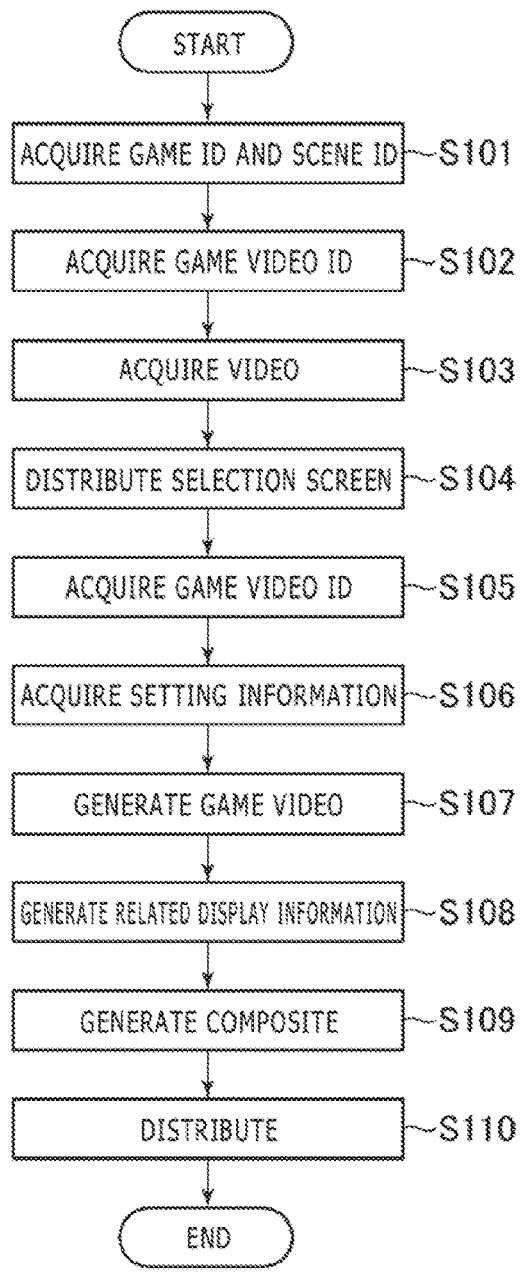
FIG. 7 is a flowchart outlining a typical process flow of the game video distribution system.

Described below by use of FIG. 7 is an outline of a typical process flow performed by the game video distribution system 100, the process flow ranging from the time the user of the present embodiment searches for and acquires a game video to the time the game video starts being viewed.

First, the selection instruction acquiring section 201 acquires from the terminal 120 the game ID identifying the game desired to be viewed by the user and the scene ID identifying the scene desired to be viewed by the user in the game (S101). The related information acquiring section 202 acquires a game video ID on the basis of the game ID and the scene ID acquired by the selection instruction acquiring section 201 (S102). The video acquiring section 203 acquires the appropriate game video from the storing section 112 on the basis of the acquired game ID (S103).

The selection screen generating section 204 generates a selection screen that allows the user to select a video desired to be viewed from among the videos acquired by the video acquiring section 203. The distributing section 205 distributes the selection screen to the terminal 120 (S104). The selection instruction acquiring section 201 acquires the game video ID identifying the video desired to be viewed by the user (S105). The setting information acquiring section 206 acquires the setting information for use in generating the game video (S106).

In accordance with the setting information, the video generating section 501 generates the game video selected by the user (S107). The related display information generating section 502 generates the related display information to be displayed along with, and in relation to, the game video to be reproduced and displayed (S108). The composing section 503 generates a composite of the game video information and the related display information generated as described above (S109). The distributing section 205 distributes the video information composed by the composing section 503 to the terminal 120 (S110).

The above-described process flow is only an example and is not limitative of the present embodiment. For example, steps S107 and S108 may be reversed in sequence or may be carried out simultaneously.

The above-described embodiment is not limitative of the present invention. The embodiment may be replaced with a structure substantially similar to that of the embodiment, a structure that provides the same effects as the embodiment, or a structure that attains the same objective as the embodiment.

For example, it was explained above that the game video desired to be viewed is selected mainly on the basis of the user's selections of the game and of the scene. Alternatively, the game video may be selected solely on the basis of the selection of the game (i.e., according to the game identification information).

In another example, the game video distribution system 100 may provide a game executing section or like section (not depicted) that executes game programs. The game executing section may be configured, upon viewing of the game video, to let the user play the game corresponding to the game video as instructed by the user in a continuation from the game video having been viewed. In still another example, the game executing section may be configured to let the user play or view a specific scene identified by the scene identification information (e.g., an aggregate of boss battles or only a particular boss battle). Also, arrangements can be made so that a currently stored game video is updated with a game video having attained a higher score.

As another alternative, arrangements can be made so that specific scenes from a plurality of related game videos are related to one another. This allows the user to view the specific scenes of the related multiple game videos. For example, the user may be allowed to view an aggregate of boss battles from the games in a particular series, an aggregate of the game videos that use the music composed by a specific person, or an aggregate of hard-to-clear video games.

Also, arrangements can be made to notify the user of an event that may take place while the game video is being viewed or the game corresponding to the game video is being played by the user. Specifically, for example, the user currently viewing the game video may be notified that an event in the form of a boss battle has occurred. The user may then be asked whether to play the game starting from the boss battle. The user may be allowed to start playing the game from the boss battle if so desired. Arrangements can also be made, when a specific event scene has ended, to notify the user thereof and ask the user whether or not to view the next event scene.

It was also explained above that the game-related information and the scene-related information have already been related to the game videos. Alternatively, given a game video to which game-related information and scene-related information have yet to be related, these items of information about the game video may be created by detecting scenes from the game video and by relating the detected scenes to that game video. Specifically, for example, an outline of the game video may be detected by scene type (e.g., by boss battle or by dialog scene) from the background music (BGM) and background images output from the game video through image recognition and voice recognition. Thereafter, the scenes classified by scene type may each be identifiably detected (e.g., as the first boss battle or second boss battle) on the basis of images and sound effects, for example. In this manner, the game video may be related to the appropriate game-related information and scene-related information. As another alternative, the user viewing the game video may be prompted to input the game-related information and the scene-related information. The detection above need not be performed in real time; it may be carried out using the game videos whose replay images have been recorded, for example.

Also, arrangements can be made to record a replay log of each played game (e.g., pad information derived from the play) instead of storing game videos. The appropriate replay log may then be used to execute the game program corresponding to a desired game video, thereby providing the game video. In this case, a digest of the game or of the game video may be created by designating the time period during which the game or the game video is desired be played or viewed (e.g., for five minutes, 15 minutes, or 90 minutes) and by specifying the content desired to be played or viewed (e.g., a plurality of boss battles may be desired to be played or viewed consecutively).

Second Embodiment

A second embodiment of the present invention is described below. In the ensuing paragraphs, the same points as those of the first embodiment will not be explained further.

FIG. 8 is a schematic explanatory view outlining a typical functional structure of a controlling section in a server according to the present embodiment. As depicted in FIG. 8, the controlling section 111 functionally includes a selection instruction acquiring section 801, a game video acquiring section 802, a comment-related information acquiring section 803, a game video generating section 804, a comment generating section 805, a composing section 806, and a distributing section 807, for example.

The selection instruction acquiring section 801 acquires game video selection instructions from the user. Specifically, for example, the user selects the game video desired to be viewed by referencing a game video selection screen distributed from the server 110 for game video selection and by operating the operating section 125 of the terminal 120. The selection instruction acquiring section 801 then acquires the appropriate game video selection instruction via the network 130. The game video selection instruction includes the game video ID identifying the selected game video, for example.

The game video acquiring section 802 acquires the game video selected by use of the game video selection instruction. Specifically, the game video is stored in the storing section 112 for example. The game video acquiring section 802 acquires from the storing section 112 the game video on the basis of the game video ID included in the game video selection instruction.

The comment-related information acquiring section 803 acquires comment-related information on the basis of the game video ID. Specifically, as depicted in FIG. 9, the storing section 112 stores game-related information in which game IDs are related to game video IDs, for example. Also, as depicted in FIG. 10, the storing section 112 stores comment-related information in which the event ID identifying each event is related to the comment ID identifying the comment given to each event, for example. The comment-related information acquiring section 803 acquires the game ID related to the game video ID acquired by the selection instruction acquiring section 801. The game video ID related to the game ID is then acquired. Specifically, suppose that in the example depicted in FIG. 9, the selection instruction acquiring section 801 acquires the game video ID of D1. In that case, with the game ID of G1 related to the game video ID of D1, the game video IDs of D1 and D2 are acquired. The comment-related information related to each of the game video IDs of D1 and D2 is then acquired. Incidentally, the event refers to any one of the occasions where the player's character has fallen into a hole and died or has been defeated by the enemy and died, where the user has selected a stage or has cleared the current stage, or where the player's character is suddenly confronted with a zombie during the game video of an action game or a shooting game, for example. In a RPG game, the event refers to any one of the occasions where a boss has appeared, where the boss has been defeated, or where magic points (MP) have been exhausted, for example. In a game in which the player performs predetermined actions in keeping with a rhythm or music (e.g., presses designated buttons on the screen or steps in a predetermined manner), the event refers to an occasion where a plurality of combo actions have been successfully carried out, for example.

Figures 11, 12:
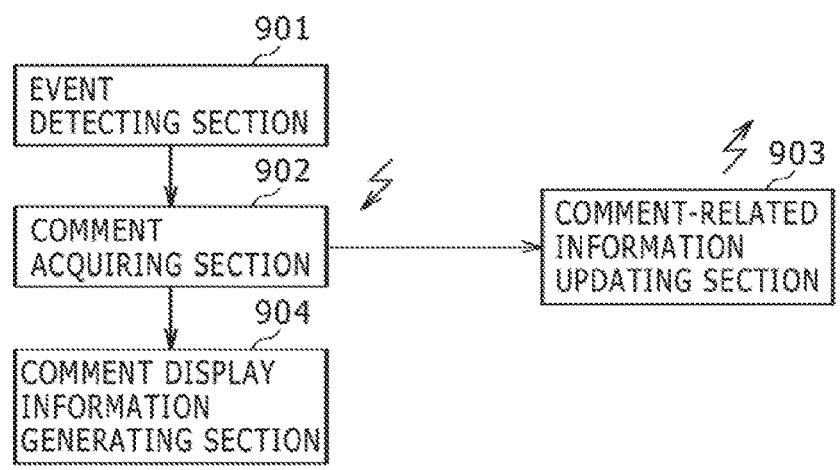
FIG. 11 is a schematic view depicting another typical comment-related information according to the second embodiment.
FIG. 12 is a schematic view depicting a typical functional structure of a comment generating section according to the second embodiment.

Specifically, suppose that in the above example, the comment-related information related to the game ID of D1 is as depicted in FIG. 10. In that case, the comment-related information acquiring section 803 acquires the comment-related information depicted in FIG. 10, for example. If the comment-related information related to the game ID of D2 is as depicted in FIG. 11, the comment-related information acquiring section 803 acquires the comment-related information depicted in FIG. 11.

The game video generating section 804 generates the game video selected by the game selection instruction. Specifically, the game video generating section 804 generates the game video acquired by the game video acquiring section 802, for example.

The comment generating section 805 generates comment information for displaying a comment. Specifically, as depicted in FIG. 12, the comment generating section 805 includes an event detecting section 901, a comment information acquiring section 902, and a comment-related information updating section 903.

The event detecting section 901 detects an event from the game video on the basis of comment-related information. Specifically, the event detecting section 901 detects the event identified by the event ID, for example. If the game is a newly developed game, for example, the event detecting section 901 may be configured to detect the event of interest by preparing an application programming interface (API) indicating the current status of the game. Upon execution of a game designed to be executed on a dedicated game machine using an emulator, for example, the event detecting section 901 may be configured to detect each event by determining which resource is currently accessed through the use of execution status information indicative of the execution status of the emulator as well as information from a graphics processing unit (GPU) and a sound processing unit (SPU). The event detecting section 901 may also be configured to detect each event using image recognition technology or the like.

On the basis of the event ID of the detected event, the comment information acquiring section 902 acquires the corresponding comment information. Specifically, for example, the comment information acquiring section 902 acquires the comment ID identifying the comment information related to the event ID included in the acquired comment-related information. For example, suppose that the acquired comment-related information is as depicted in FIGS. 10 and 11 and that the event detecting section 901 has acquired the event ID of I1. In that case, the comment information acquiring section 902 acquires the comment IDs identified by the comment IDs of C1, C2, C6, and C7. Alternatively, the comment information acquiring section 902 may be configured to acquire the comment information input by the user, for example.

If the comment information acquiring section 902 has acquired the comment information from the user, the comment-related information updating section 903 updates the corresponding comment-related information. Specifically, for example, suppose that while viewing the game video depicted in FIG. 10, the user inputs the comment information identified by the comment ID of C10 with regard to the event identified by the event ID of I1. In that case, the comment-related information updating section 903 performs the update of adding the comment ID of C10 to the event ID of I1 in FIG. 10. The user inputs the comment through the currently used terminal 120, for example. It was explained above that one comment ID is related to one event ID. Alternatively, a plurality of comment IDs may obviously be related to one event ID. And although it was also explained above that the comment ID is related to the event ID, a comment itself (comment information) may be related to the event ID instead.

A comment display information generating section 904 generates comment display information for displaying the acquired comment ID. In the case of an event whose progress timing can be controlled by the player, for example, the comment display information generating section 904 may be configured to generate the comment display information in a manner displaying the comment in keeping with the display of a dialog. When the comment corresponding to another user's dialog is thus displayed, the other user's impression can be shared, for example. In other examples, a comment may be displayed at the timing when a game character talks or performs a specific action in the game. In the case of an automatically progressing game event, the comment display information generating section 904 may be configured to display the timing upon elapse of a predetermined time period from the start of a specific scene, such as the timing of 30 seconds into the ending. The comment display information generating section 904 may also be configured to display a comment at the timing when the player has accomplished something in the game such as the vanquishing of a boss, or when the status of the player's character has changed (e.g., the character's level has been raised or the character is nearly defeated by a boss). The comment display information generating section 904 may further be configured to change the manner in which the comment is displayed (e.g., in font and in letter size) in response to the event.

The composing section 806 generates a composite video of the generated comment display information and the generated game video. The distributing section 807 distributes the composite video.

Figure 13:
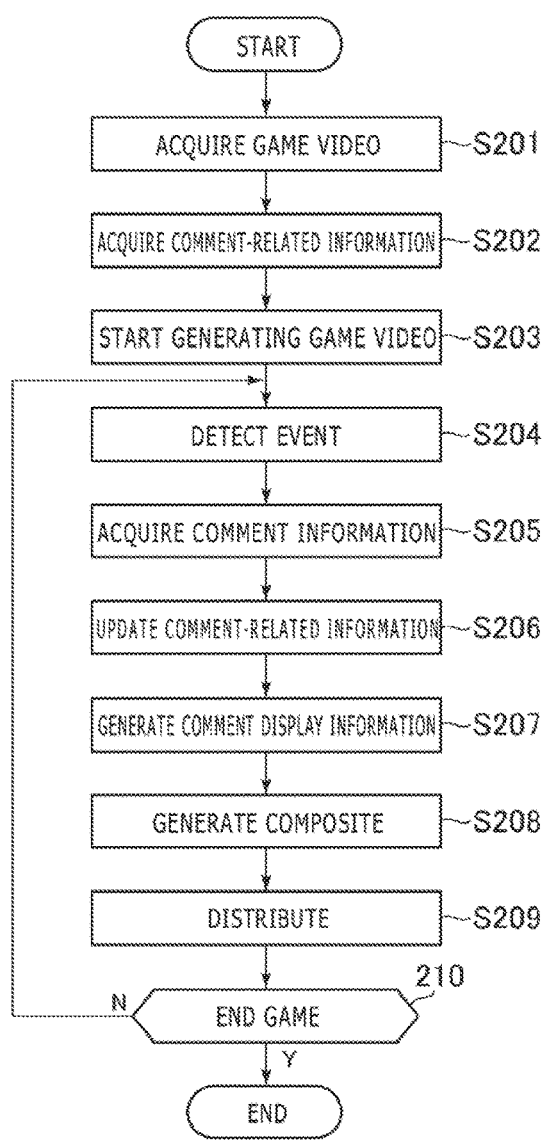
FIG. 13 is a flowchart outlining a typical process flow of the game video distribution device according to the second embodiment.

Described below by use of FIG. 13 is a typical process flow performed by the game video distribution device of the present embodiment. The process flow depicted in FIG. 13, it should be noted, is only an example and is not limitative of the present embodiment.

The selection instruction acquiring section 801 acquires the user's game video selection instruction (S201). The comment-related information acquiring section 803 acquires the comment-related information on the basis of the acquired game video ID (S202).

The game video generating section 804 starts generating the game video selected by the game selection instruction (S203). The event detecting section 901 detects an event from the generated game video (S204). The comment information acquiring section 902 acquires the comment identification information related to the event ID of the detected event (S205). When the comment information acquiring section 902 has acquired the comment information from the user, the comment-related information updating section 903 updates the corresponding comment-related information (S206).

The comment display information generating section 904 generates the comment information for displaying the acquired comment ID (S207). In response to the event detected by the event detecting section 901, the composing section 806 generates a composite of the generated comment information and the game video (S208). The distributing section 807 distributes the composite video (S209). At the end of the game, the process is terminated. If the game is still in progress, step S203 is reached again. The end of the game may be a predetermined manner of game ending such as the completion of the last stage or the game end designated by the user's game end instruction, for example.

According to the present embodiment, any event in the game video or in the game is related to comment information indicative of comments. Thus instead of the comments given to the currently viewed game video, comments given to another game video of the same game may be displayed upon detection of the event in the game video. This means that when a game video with a small number of comments is being viewed, additional comments can be displayed.

The above-described embodiment is not limitative of the present invention. The embodiment may be replaced with a structure substantially similar to that of the embodiment, a structure that provides the same effects as the embodiment, or a structure that attains the same objective as the embodiment.

Variation

Figure 14:
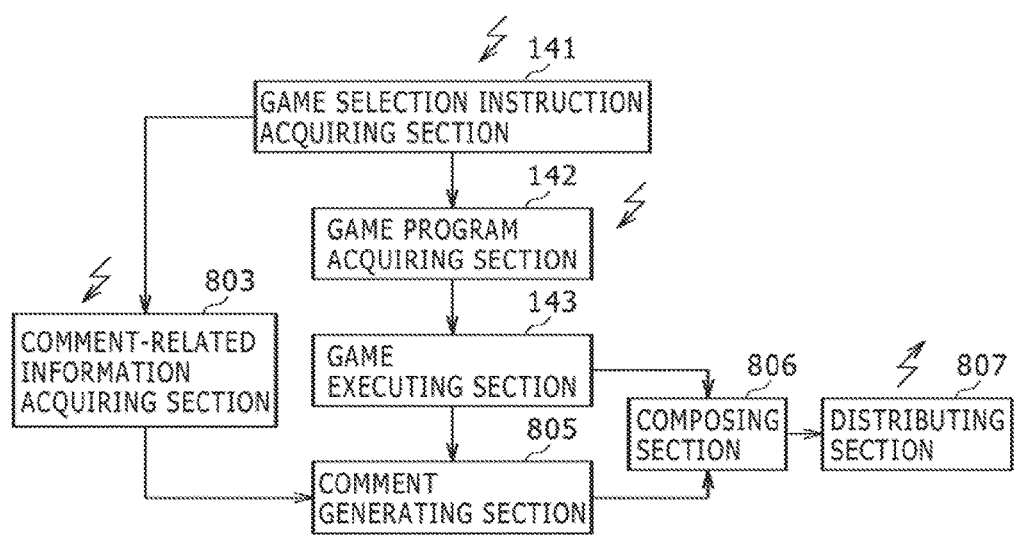
FIG. 14 is a schematic view outlining a typical functional structure of a controlling section in a server according to a variation of the second embodiment.

FIG. 14 is a schematic explanatory view outlining a typical functional structure of the controlling section 111 in the server 110 according to a variation of the second embodiment. In the ensuing paragraphs, the same points as those of the second embodiment will not be explained further.

In this variation, as depicted in FIG. 14, the controlling section 111 functionally includes a game selection instruction acquiring section 141, a game program acquiring section 142, a comment-related information acquiring section 803, a game executing section 143, a comment generating section 805, a composing section 806, and a distributing section 807, for example.

The game selection instruction acquiring section 141 acquires game selection instructions from the user. Specifically, for example, the user selects the game desired to be played by referencing a game selection screen distributed from the server 110 for game selection and by operating the operating section 125 of the terminal 120. The game selection instruction acquiring section 141 then acquires the appropriate game selection instruction via the network 130. The game selection instruction includes the game ID identifying the selected game, for example.

The game program acquiring section 142 acquires the game program selected by the game selection instruction from the user. Specifically, for example, the game video is stored in the storing section 112. The game video acquiring section 802 acquires from the storing section 112 the game program on the basis of the game ID included in the game selection instruction acquired by the game selection instruction acquiring section 141.

The comment-related information acquiring section 803 acquires comment-related information on the basis of the game ID acquired by the game selection instruction acquiring section 141. Specifically, as in the above-described second embodiment, the storing section 112 stores game-related information in which game IDs are related to game video IDs as depicted in FIG. 9, for example. Also, as depicted in FIG. 10, the storing section 112 stores comment-related information in which the event ID identifying each event is related to the comment ID identifying the comment given to each event, for example. The comment-related information acquiring section 803 acquires the game video ID related to the game ID acquired by the selection instruction acquiring section 801. Specifically, suppose that in the example depicted in FIG. 9, the selection instruction acquiring section 801 has acquired the game G1. In that case, the game video IDs of D1 and D2 are acquired. The comment-related information related to each of the game video IDs is then acquired.

The game executing section 143 generates the game video by executing the program of the game selected by the game selection instruction. Specifically, for example, the game executing section 143 generates the game video by executing the game program acquired by the game program acquiring section 142.

The comment generating section 805 generates comment information for displaying a comment. Specifically, as in the above-described second embodiment, the comment generating section 805 includes an event detecting section 901, a comment information acquiring section 902, and a comment-related information updating section 903, for example.

The event detecting section 901 detects an event from the game video on the basis of the acquired comment-related information. Specifically, the event detecting section 901 detects the event identified by the event ID included in the acquired comment-related information, for example. The comment information acquiring section 902 acquires the corresponding comment information on the basis of the event ID of the detected event. When the comment information acquiring section 902 has acquired the comment information from the user, the comment-related information updating section 903 updates the corresponding comment-related information. The comment display information generating section 904 generates the comment information for displaying the acquired comment ID. The composing section 806 generates a composite of the generated comment display information and the game video.

According to the above variation, the comments given to another game video of the same game can be displayed in keeping with the progress of execution of the game selected by the user. Specifically, a comment can be displayed at the timing when the player's character has been defeated by a boss or has fallen into a hole and died, for example.

The above-described embodiments are not limitative of the present invention. Each of these embodiments may be replaced with a structure substantially similar to that of the embodiment, a structure that provides the same effects as the embodiment, or a structure that attains the same objective as the embodiment. For example, some or all of the first embodiment, the second embodiment, and the variation may be combined for use in implementing the invention. Although it was explained for example that the variation mainly displays the comments included in the game video corresponding to the game program being executed, arrangements can be made to store the game video based on the execution of the game program. Incidentally, the game video generating means claimed in the appended claims corresponds to the game video generating section 804 or the game executing section 143, for example. Also, the game video distribution device claimed in the appended claims corresponds to the server 110, for example.

The invention claimed is:

1. A game video distribution device comprising: a processor, a non-transient computer readable storage medium, and a computer program contained within the non-transient computer readable storage medium, wherein the computer program, when executed by the processor, causes the game video distribution device to:
generate a game video selected by a user;
acquire related information in which scene identification information identifying individual scenes included in the game video is related to time information representing a time period during which each of the scenes is reproduced;
generate related display information identifiably displaying a temporal location of each of the scenes relative to an entire time span of the game video in accordance with the related information;
acquire setting information about the generation of the game video, the setting information including: (i) a major scene setting, (ii) a spoiler scene setting, (iii) one or more plays during gameplay that failed to advance from one scene to another, and (iv) any scenes of the gameplay yet to be cleared by the user, wherein the generation of the game video also automatically modifies, on the basis of the setting information, a base version of the game video to omit at least some scenes therefrom in order to generate the game video; and
generate a composite of the generated game video and the related display information.

2. The game video distribution device according to claim 1, wherein:
the scenes include a plurality of scene types, and
the generation of the related display information includes generating the related display information displaying each of the scenes in each of the scene types.

3. The game video distribution device according to claim 1, wherein the computer program, when executed by the processor, causes the game video distribution device to:
acquire, as the setting information, progress information indicative of progress status of the user regarding a game program corresponding to the game video,
wherein the generation of the video includes generating at least a part of the game video in accordance with the progress status of the user.

4. The game video distribution device according to claim 1, wherein the computer program, when executed by the processor, causes the game video distribution device to:
acquire game identification information identifying the game video desired to be viewed by the user and the scene identification information identifying a scene in the game video in accordance with a selection instruction from the user; and
generate selection screen information representing a selection screen selecting a plurality of game videos identified by game video identification information related to the acquired game identification information and to the acquired scene identification information,
wherein the generation of the video includes generating one of the game videos among the plurality of game videos in accordance with a selection by the user.

5. The game video distribution device according to claim 1, wherein the computer program, when executed by the processor, causes the game video distribution device to generate the related information on the basis of the generated game video.

6. A game video distribution method comprising:
generating a game video selected by a user;
acquiring related information in which scene identification information identifying individual scenes included in the game video is related to time information representing a time period during which each of the scenes is reproduced;
in accordance with the related information, generating related display information identifiably displaying a temporal location of each of the scenes relative to an entire time span of the game video;
acquiring setting information about the generation of the game video, including: (i) a major scene setting, (ii) a spoiler scene setting, (iii) one or more plays during gameplay that failed to advance from one scene to another, and (iv) any scenes of the gameplay yet to be cleared by the user, wherein the generation of the video includes automatically modifying, on the basis of the setting information, a base version of the game video to omit at least some scenes therefrom in order to generate the game video; and
generating a composite of the generated game video and the related display information.

7. A game video distribution device comprising: a processor, a non-transient computer readable storage medium, and a computer program contained within the non-transient computer readable storage medium, wherein the computer program, when executed by the processor, causes the game video distribution device to:
generate a game video from execution of a game application of a computer game;
acquire game video identification information representing another game video generated from another game application of a same computer game as that of the computer game, event identification information related to the game video identification information and identifying an event in the game video, and comment-related information including comment identification information identifying a comment on the event;
generate comment display information displaying the comment identified by the comment identification information on the basis of the comment-related information;
acquire related information in which scene identification information identifying individual scenes included in the game video is related to time information representing a time period during which each of the scenes is reproduced;
generate related display information identifiably displaying a temporal location of each of the scenes relative to an entire time span of the game video in accordance with the related information;
acquire setting information about the generation of the game video, the setting information including: (i) a major scene setting, and (ii) a spoiler scene setting, (iii) one or more plays during gameplay that failed to advance from one scene to another, and (iv) any scenes of the gameplay yet to be cleared by the user, wherein the generation of the game video also automatically modifies, on the basis of the setting information, a base version of the game video to omit at least some scenes therefrom in order to generate the game video; and
generate a composite video of the generated comment display information, the related display information, and the generated game video,
wherein the actions to generate the comment include causing the game video distribution device to:

detect the event from the generated game video on the basis of the comment-related information;

acquire the comment identification information identifying the comment on the detected event, and generate comment display information displaying the comment identified by the comment identification information upon detection of the event.

8. The game video distribution device according to claim 7, wherein the computer program, when executed by the processor, causes the game video distribution device to:

acquire the game video identification information identifying the game video in accordance with an instruction from a user, wherein the generation of the game video includes generating the game video identified by the acquired game video identification information.

9. The game video distribution device according to claim 7, wherein the computer program, when executed by the processor, causes the game video distribution device to:

acquire game identification information identifying a game in accordance with an instruction from a user; and acquire a game program identified by the acquired game identification information, wherein the generation of the game video includes generating the game video by executing the acquired game program.

10. The game video distribution device according to claim 7, wherein the computer program, when executed by the processor, causes the game video distribution device to:

update the comment-related information on the basis of the comment from a user viewing the game video.

* * * * *